United States Patent
Motegi et al.

(10) Patent No.: US 7,076,258 B2
(45) Date of Patent: Jul. 11, 2006

(54) LOCATION REGISTRATION METHOD AND PAGING METHOD IN MOBILE COMMUNICATION SYSTEM, MOBILE COMMUNICATION SYSTEM, BASE STATION, COMMUNICATION CONTROL METHOD, MOBILE STATION, AND COMMUNICATION CONTROL PROGRAM

(75) Inventors: Masayuki Motegi, Yokohama (JP);
Hidetoshi Kayama, Yokohama (JP);
Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 501 days.

(21) Appl. No.: 10/237,026

(22) Filed: Sep. 9, 2002

(65) Prior Publication Data
US 2003/0050078 A1  Mar. 13, 2003

(30) Foreign Application Priority Data
Sep. 10, 2001  (JP) ............................ 2001-273940

(51) Int. Cl.
*H04Q 7/20* (2006.01)
(52) U.S. Cl. ............... 455/456.1; 455/422.1; 455/443; 455/455; 455/456.4; 455/458; 455/426.1; 455/435.1; 370/349; 370/236.1
(58) Field of Classification Search ............... 455/456, 455/435.1, 456.1, 458, 426.1, 456.4, 455, 455/422.1, 443; 370/349, 236.1
See application file for complete search history.

(56) References Cited

U.S. PATENT DOCUMENTS

| 5,369,681 A | * | 11/1994 | Boudreau et al. ......... 455/456.1 |
| 5,548,586 A | * | 8/1996 | Kito et al. .................. 370/349 |
| 5,594,776 A | * | 1/1997 | Dent ........................... 455/458 |
| 5,642,398 A | * | 6/1997 | Tiedemann et al. ...... 455/426.1 |
| 5,649,286 A | * | 7/1997 | Frerking .................. 455/435.1 |
| 5,924,042 A | * | 7/1999 | Sakamoto et al. .......... 455/458 |

FOREIGN PATENT DOCUMENTS

| EP | 1 107 626 | 6/2001 |
| EP | 1107626 A2 * | 6/2001 |
| EP | 1 124 399 | 8/2001 |
| EP | 1124399 A1 * | 8/2001 |

(Continued)

OTHER PUBLICATIONS

F. Adelstein, et al., Parallel Processing, XP-010356077, pp. 17-22, "Building Dynamic Multicast Trees in Mobile Networks", Sep. 21, 1999.

*Primary Examiner*—William Trost
*Assistant Examiner*—Chuck Huynh
(74) *Attorney, Agent, or Firm*—Oblon, Spivak, McClelland, Maier & Neustadt, P.C.

(57) ABSTRACT

A system controlling the traffic balance between the paging of incoming calls and a location registration and including a plurality of base and mobile stations and a management server for location information of each mobile station. A set of cells formed by the base stations constitutes a first area group. Each mobile station shifts to a mode periodically receiving signals from the base stations if no signals are transmitted and received for a predetermine period. Each base station forms second to n-th area groups (n≧2), each having an area smaller than that of the first area, to be used when the mobile stations are in idle state. Each mobile station selects the area group to register according to the period in which no packet is received and transmitted, and registers its location while specifying an area within this area group with respect to the server.

24 Claims, 15 Drawing Sheets

FOREIGN PATENT DOCUMENTS

| | | |
|---|---|---|
| JP | 5-3581 | 1/1993 |
| WO | WO 95/11577 | 4/1995 |
| WO | WO 99/31917 | 6/1999 |
| WO | WO 99/57935 | 11/1999 |
| WO | WO 00/03557 | 1/2000 |
| WO | WO 02/067511 | 8/2002 |

* cited by examiner

LOCATION REGISTRATION AREA GROUP A

LOCATION REGISTRATION AREA GROUP B(10~13)

| MOBILE STATION | LOCATION REGISTRATION AREA |
|---|---|
| MT#1 | B14 |
| MT#2 | C7 |
| MT#3 | A1 |
| MT#4 | D3 |
| MT#5 | B5 |
| ⋮ | ⋮ |

Fig.8

| BASE STATION # | AIC | G1 | G2 | G3 |
|---|---|---|---|---|
| BS#1 | A1 | B1 | C1 | D1 |
| BS#2 | A1 | B1 | C1 | D1 |
| BS#3 | A1 | B1 | C1 | D2 |
| BS#4 | A1 | B1 | C1 | D2 |
| BS#5 | A1 | B1 | C2 | D3 |
| BS#6 | A1 | B1 | C2 | D3 |
| BS#7 | A1 | B2 | C2 | D4 |
| BS#8 | A1 | B2 | C2 | D4 |
| BS#9 | A1 | B2 | C3 | D5 |
| BS#10 | A1 | B2 | C3 | D5 |
| ⋮ | ⋮ | ⋮ | ⋮ | ⋮ |
| BS#96 | A1 | B16 | C24 | D48 |

*Fig.15*

| MOBILE STATION | LOCATION REGISTRATION AREA |
|---|---|
| MT#1 | BS#51,BS#52,BS#53,BS#54,BS#55,BS#56,BS#57,BS#58 |
| MT#2 | BS#26,BS#27,BS#28 |
| MT#3 | BS#3,BS#4,BS#5,BS#6,BS#7 |
| MT#4 | BS#11,BS#12,BS#13,BS#14,BS#15 |
| MT#5 | BS#21,BS#22 |
| ⋮ | ⋮ |

LOCATION REGISTRATION METHOD AND PAGING METHOD IN MOBILE COMMUNICATION SYSTEM, MOBILE COMMUNICATION SYSTEM, BASE STATION, COMMUNICATION CONTROL METHOD, MOBILE STATION, AND COMMUNICATION CONTROL PROGRAM

BACKGROUND OF THE INVENTION

1. Field of the Invention

The present invention relates to a location registration method and a paging method in a mobile communication system, a mobile communication system, a base station, a communication control method, a mobile station, and a communication control program; and, in particular, to a location registration method and a paging method for a mobile station which is in a sleep mode in a wireless packet communication, the mobile station, a base station, a mobile communication system constituted by including them, a communication control method, and a communication control program.

2. Related Background Art

A digital car phone system referred to as PDC (Personal Digital Cellular) has been known (ARIB RCR STD-27H: digital car phone system standard). This system employs a multilayer location registration area scheme in which, while a location registration area where each mobile station registers a location information is divided into a plurality of groups, each group has a plurality of layers. The location registration area differs from one group to another, which is effective in preventing location registration traffic from being centered at specific cells in area boundaries. Each mobile station is notified of location registration area information of the group to which it belongs by notification information from a base station, compares thus notified location registration area information with its own registered location registration area information, and registers its location information if the information differs from the registered information. A characteristic feature here is that the location registration areas corresponding to the groups to which each mobile station belong have substantially the same size among all the mobile stations regardless of the traffic specific to the mobile stations. Since the location registration areas are multiplexed, so that a location registration area centered at a cell in which a mobile station always exists is selectively registered, the probability of traversing location registration areas is reduced, whereas a hysteresis is provided, which is effective in restraining location registration signals from frequently being transmitted, i.e., suppressing fluttering.

Japanese Patent Application Laid-Open No. HEI 5-3581 discloses a location registration and paging scheme for a mobile communication system. This scheme is concerned with a mobile communication system in which base stations determine overlapping location registration areas in an autonomous decentralized manner, whereas each mobile station receives location registration area information broadcasted from a base station, compares its registered location registration area information with the location registration area information obtained from the broadcasted information, and registers a location information when it moves to a cell not included in the location registration area information own registered thereby. Each mobile station stores cells passed thereby after the location registration as route information and notifies a base station of the route information at the time of the next location registration. Here, the base station absorbs cells having a large amount of route information into a location registration area, thereby reconstructing the location registration area.

This scheme is targeted at connection-oriented mobile communication systems, in which a line-switching station broadcasts a call signal for a mobile station to all the base stations belonging to a location registration area. The number of cells included in the location registration area is increased/decreased according to the amount of traffic. Namely, the number of cells included in the location registration area is decreased when the paging traffic to a mobile station exceeds a predetermined amount, whereas the number is increased when the paging traffic received from the mobile station exceeds a predetermined amount, whereby the paging traffic and location registration traffic can be kept in balance.

The conventional techniques such as those mentioned above are employed in connection-oriented mobile communication systems, and fail to address problems specific to packets in wireless packet communication systems. Namely, they fail to take account of how to conserve battery of mobile stations which are in idle state when a connection cannot clearly be associated with a physical link, thus being unsuitable for wireless packet communications. Effective battery conservation method in packet communications is one in which a mobile terminal registers its location to which belongs as in line-switching to receive paging signals periodically. However, this method may be problematic in that the location registration occurs frequently when the location registration area is small, thereby increasing the traffic for location registration.

Though the location registration traffic can decrease if the location registration area is made larger, this may be problematic in that the traffic of paging upon incoming calls increases. Therefore, it is necessary that the size of a location registration area taking account of the traffic balance between location registration traffic and paging traffic upon incoming calls be set dynamically. Battery conservation effect depends on location registration frequency and paging interval. Consequently, they are required to be controlled flexibly according to traffic characteristics of individual terminals in connectionless packet communications.

Though multilayer location registration areas are set in the above-mentioned digital car phone system in order to prevent location registration traffic from increasing in specific cells, there is a fear of failing to keep a traffic balance when applied to packet communications, since the respective location registration areas corresponding to the individual groups have the same size.

The location registration and paging system for a mobile communication system disclosed in the above-mentioned Japanese Patent Application Laid-Open No. HEI 5-3581 sets a location registration area while taking account of only the size of location registration area according to the amounts of location registration traffic and paging traffic without control considered the traffic characteristics of each mobile station specific to packet communications, whereby the location registration area does not always attain an optimal size.

SUMMARY OF THE INVENTION

In view of such circumstances, it is an object of the present invention to provide a location registration method and a paging method in a mobile communication system, a mobile communication system, abase station, a communication control method, a mobile station, and a communication control program which can control the balance between paging traffic upon incoming calls and location registration traffic according to traffic at the time when a packet is transmitted/received, and can carry out efficient battery conservation in a mobile station.

For achieving the above-mentioned object, the present invention provides a location registration method in a mobile communication system constituted by a plurality of base stations, a plurality of mobile stations, a network connected to the base stations, and a location information management server, connected to the network, for managing location information of each mobile station and state information thereof; a set of respective cells formed by the base stations constituting a first location registration area group, the base stations and mobile stations communicating by packet within the cells, whereas the mobile stations transiting to a mode periodically receiving a signal transmitted from the base stations if no packet is transmitted and received for a predetermined period even in a communication state; wherein the base stations form second to n-th location registration area groups (where n is a natural number of 2 or greater), each having a range smaller than that of the first location registration area such that the area size decreases as n is greater, to be included in the first location registration area group used when the mobile stations are in idle state; and wherein the mobile stations select the location registration area groups to register the location information according to a period in which no packet is transmitted and received in the above-mentioned mode, and register a location information to the server while specifying a location registration area within the location registration area group with respect to the location information management server.

The present invention provides a mobile communication system constituted by a plurality of base stations, a plurality of mobile stations, a network connected to the base stations, and a location information management server, connected to the network, for managing location information of each mobile station and state information thereof; a set of respective cells formed by the base stations constituting a first location registration area group, the base stations and mobile stations communicating by packet within the cells, whereas the mobile stations transiting to a mode periodically receiving a signal transmitted from the base stations if no packet is transmitted and received for a predetermined period even in a communication state; wherein the base stations form second to n-th location registration area groups (where n is a natural number of 2 or greater), each having a range smaller than that of the first location registration area such that the area size decreases as n is greater, to be included in the first location registration area group used when the mobile stations are in idle state; and wherein the mobile stations select the location registration area groups to register the location information according to a period in which no packet is transmitted and received in the above-mentioned mode, and register a location information to the server while specifying a location registration area within the location registration area group with respect to the location information management server.

The base stations and mobile stations in the location registration method in a mobile communication system and the mobile communication system maybe configured as follows:

Namely, the base station may be configured to have a plurality of paging area identifiers respectively corresponding to the first to n-th location registration area groups, and periodically broadcast the paging area identifiers in synchronization with the paging interval of is each mobile station.

Also, the mobile station having transited to the above-mentioned mode and periodically receiving a signal may move after registering a location information in one of the first to n-th location registration area groups and, if the paging identifier is changed as a result of moving, the mobile station may register a location information to the server after reselecting one of the location registration area groups according to the period in which no packet is transmitted and received and change the paging interval.

The base stations may be configured to exchange location information with a plurality of base stations adjacent thereto via radio or via the network, and individually form the first to n-th location registration area groups according to thus exchanged location information of adjacent base stations.

The base stations maybe configured to be discriminated from each other according to respective specific identifiers assigned thereto and, upon receiving a signal requesting a location registration from the mobile station, notify the mobile station of respective specific identifiers of the base stations constituting the first to n-th location registration area groups.

The mobile station may be configured to receive the specific identifier broadcasted from the base station in the above-mentioned mode, and register a location information to the server if thus received specific identifier is not included in the specific identifiers of the base stations constituting the location registration area groups when the mobile station registered a location information.

The present invention provides a paging method in a mobile communication system constituted by a plurality of base stations, a plurality of mobile stations, a network connected to the base stations, and a location information management server, connected to the network, for managing location information of each mobile station and state information thereof; a set of respective cells formed by the base stations constituting a first location registration area group, the base stations and mobile stations communicating by packet within the cells, whereas the mobile stations transiting to a mode periodically receiving a signal transmitted from the base stations if no packet is transmitted and received for a predetermined period even in a communication state; wherein the base stations form second to n-th location registration are a groups (where n is a natural number of 2 or greater), each having a range smaller than that of the first location registration area such that the area size decreases as n is greater, to be included in the first location registration area group used when the mobile stations are in idle state; wherein a packet transmitted to the mobile station is transferred to the location information management server and then, according to information in the location information management server, to the base station forming a cell in which the destination mobile station exists; wherein the mobile station notifies the location information management server of a shift to the above-mentioned mode or a cancellation of the communication state when transiting to the above-mentioned mode or canceling the communication state and specifies the location registration area group; and wherein the location information management server carries out paging with respect to the base stations within the location registration areas constituting the location registration area notified by the mobile station when the packet transmitted to the mobile station is transferred.

The present invention provides a mobile communication system constituted by a plurality of base stations, a plurality of mobile stations, a network connected to the base stations, and a location information management server, connected to the network, for managing location information of each mobile station and state information thereof; a set of respective cells formed by the base stations constituting a first location registration area group, the base stations and mobile stations communicating by packet within the cells, whereas the mobile stations transiting to a mode periodically receiving a signal transmitted from the base stations if no packet is transmitted and received for a predetermined period even in a communication state; wherein the base stations form second to n-th location registration area groups (where n is a natural number of 2 or greater), each having a range smaller than that of the first location registration area such that the area size decreases as n is greater, to be included in the first location registration area group used when the mobile stations are in idle state; wherein a packet transmitted to the mobile station is transferred to the location information management server and then, according to information in the location information management server, to the base station forming a cell in which the destination mobile station exists; wherein the mobile station notifies the location information management server of a shift to the above-mentioned mode or a cancellation of the communication state when transiting to the above-mentioned mode or canceling the communication state and specifies the location registration area group; and wherein the location information management server carries out paging with respect to the base stations within the location registration areas constituting the location registration area notified by the mobile station when the packet transmitted to the mobile station is transferred.

The base stations and mobile stations in the paging method in a mobile communication system and the mobile communication system may be configured as follows:

Namely, the base station may be configured to have a plurality of paging area identifiers respectively corresponding to the first to n-th location registration area groups, and periodically broadcast the paging area identifiers in synchronization with the paging interval of each mobile station.

Also, the mobile station having transited to the above-mentioned mode and periodically receiving a signal may move after registering a location information in one of the first to n-th location registration area groups and, if the paging is changed as a result of moving, the mobile station may register a location information to the server after reselecting one of the location registration area groups according to the period in which no packet is transmitted and received and change the paging interval.

The base stations maybe configured to exchange location information with a plurality of base stations adjacent thereto via radio or via the network, and individually form the first to n-th location registration area groups according to thus exchanged location information of adjacent base stations.

Meanwhile, the present invention can be interpreted as each of base stations and mobile stations constituting a mobile communication system, a communication control method, and a communication control program, and can be described as follows:

For achieving the above-mentioned object, the present invention provides a base station, connected to a network, for constituting a mobile communication system together with a plurality of mobile stations, the network, and a location information management server, connected to the network, for managing location information of each mobile station and state information thereof; wherein, in thus configured mobile communication system, a plurality of base stations exist, a set of respective cells formed by the base stations constituting a first location registration area group, the base stations and mobile stations communicating by packet within the cells, whereas the mobile stations transiting to a mode periodically receiving a signal transmitted from the base stations if no packet is transmitted and received for a predetermined period even in a communication state; and wherein the base stations form second to n-th location registration area groups (where n is a natural number of 2 or greater), each having a range smaller than that of the first location registration area such that the area size decreases as n is greater, to be included in the first location registration area group used when the mobile stations are in idle state; the base station having a plurality of paging area identifiers respectively corresponding to the first to n-th location registration area groups, the base station periodically broadcasting the paging area identifiers and a control signal in synchronization with a paging interval of each mobile station.

The present invention provides a base station, connected to a network, for constituting a mobile communication system together with a plurality of mobile stations, the network, and a location information management server, connected to the network, for managing location information of each mobile station and state information thereof; wherein, in thus configured mobile communication system, a plurality of base stations exist, a set of respective cells formed by the base stations constituting a first location registration area group, the base stations and mobile stations communicating by packet within the cells, whereas the mobile stations transiting to a mode periodically receiving a signal transmitted from the base stations if no packet is transmitted and received for a predetermined period even in a communication state; and wherein the base stations form second to n-th location registration area groups (where n is a natural number of 2 or greater), each having a range smaller than that of the first location registration area such that the area size decreases as n is greater, to be included in the first location registration area group used when the mobile stations are in idle state; the base station exchanging location information with a plurality of base stations adjacent thereto via radio or via the network and individually forming the first to n-th location registration area groups according to thus exchanged location information of adjacent base stations.

Here, the base stations may be configured to be discriminated from each other according to respective specific identifiers assigned thereto and, upon receiving a signal requesting a location registration from the mobile station, notify the mobile station of respective specific identifiers of the base stations constituting the first to n-th location registration area groups.

The present invention provides a base station, connected to a network, for constituting a mobile communication system together with a plurality of mobile stations, the network, and a location information management server, connected to the network, for managing location information of each mobile station and state information thereof; wherein, in thus configured mobile communication system, a plurality of base stations exist, a set of respective cells formed by the base stations constituting a first location registration area group, the base stations and mobile stations communicating by packet within the cells, where as the mobile stations transiting to a mode periodically receiving a signal transmitted from the base stations if no packet is transmitted and received for a predetermined period even in a communication state; and wherein the base stations form second to n-th location registration area groups (where n is a natural number of 2 or greater), each having a range smaller than that of the first location registration area such that the area size decreases as n is greater, to be included in the first location registration area group used when the mobile stations are in idle state; the base station selecting the location registration area group to register a mobile station in the periodically receiving mode according to a period in which no packet is transmitted and received in the mobile station, and notifying the mobile station of information of the selected location registration area group.

For achieving the above-mentioned object, the present invention provides a communication control method in a base station, connected to a network, for constituting a mobile communication system together with a plurality of mobile stations, the network, and a location information management server, connected to the network, for managing location information of each mobile station and state information thereof; wherein, in thus configured mobile communication system, a plurality of base stations exist, a set of respective cells formed by the base stations constituting a first location registration area group, the base stations and mobile stations communicating by packet within the cells, whereas the mobile stations transiting to a mode periodically receiving a signal transmitted from the base stations if no packet is transmitted and received for a predetermined period even in a communication state; and wherein the base stations form second to n-th location registration area groups (where n is a natural number of 2 or greater), each having a range smaller than that of the first location registration area such that the area size decreases as n is greater, to be included in the first location registration area group used when the mobile stations are in idle state; the base station having a plurality of paging area identifiers respectively corresponding to the first to n-th location registration area groups, the base station periodically broadcasting the paging area identifiers and a control signal in synchronization with a paging interval of each of the mobile station.

The present invention provides a communication control method in a base station, connected to a network, for constituting a mobile communication system together with a plurality of mobile stations, the network, and a location information management server, connected to the network, for managing location information of each mobile station and state information thereof; wherein, in thus configured mobile communication system, a plurality of base stations exist, a set of respective cells formed by the base stations constituting a first location registration area group, the base stations and mobile stations communicating by packet within the cells, whereas the mobile stations transiting to a mode periodically receiving a signal transmitted from the base stations if no packet is transmitted and received for a predetermined period even in a communication state; and wherein the base stations form second to n-th location registration area groups (where n is a natural number of 2 or greater), each having a range smaller than that of the first location registration area such that the area size decreases as n is greater, to be included in the first location registration area group used when the mobile stations are in idle state; the base station exchanging location information with a plurality of base stations adjacent thereto via radio or via the network and individually forming the first to n-th location registration area groups according to thus exchanged location information of adjacent base stations.

Here, the communication control method in accordance with the present invention may be configured such that the base stations are discriminated from each other according to respective specific identifiers assigned thereto and, upon receiving a signal requesting a location registration from the mobile station, notify the mobile station of respective specific identifiers of the base stations constituting the first to n-th location registration area groups.

The present invention provides a communication control method in a base station, connected to a network, for constituting a mobile communication system together with a plurality of mobile stations, the network, and a location information management server, connected to the network, for managing location information of each mobile station and state information thereof; wherein, in thus configured mobile communication system, a plurality of base stations exist, a set of respective cells formed by the base stations constituting a first location registration area group, the base stations and mobile stations communicating by packet within the cells, whereas the mobile stations transiting to a mode periodically receiving a signal transmitted from the base stations if no packet is transmitted and received for a predetermined period even in a communication state; and wherein the base stations form second to n-th location registration area groups (where n is a natural number of 2 or greater), each having a range smaller than that of the first location registration area such that the area size decreases as n is greater, to be included in the first location registration area group used when the mobile stations are in idle state; the base station selecting the location registration area group to register a mobile station in the periodically receiving mode according to a period in which no packet is transmitted and received in the mobile station, and notifying the mobile station of information of the selected location registration area group.

For achieving the above-mentioned object, the present invention provides a mobile station for constituting a mobile communication system together with a plurality of base stations, a network connected to the base stations, and a location information management server, connected to the network, for managing location information of each mobile station and state information thereof; wherein, in thus configured mobile communication system, a plurality of mobile stations exist, a set of respective cells formed by the base stations constituting a first location registration area group, the base stations and mobile stations communicating by packet within the cells, whereas the mobile stations transiting to a mode periodically receiving a signal transmitted from the base stations if no packet is transmitted and received for a predetermined period even in a communication state; and wherein the base stations form second to n-th location registration area groups (where n is a natural number of 2 or greater), each having a range smaller than that of the first location registration area such that the area size decreases as n is greater, to be included in the first location registration area group used when the mobile stations are in idle state; the mobile station selecting the location registration area group to register the mobile station according to a period in which no packet is transmitted and received in the periodically receiving mode, and transmitting information of thus selected location registration area group to the location information management server for a location registration or paging of the base stations.

The present invention provides a mobile station for constituting a mobile communication system together with a plurality of base stations, a network connected to the base stations, and a location information management server, connected to the network, for managing location information of each mobile station and state information thereof; wherein, in thus configured mobile communication system, a plurality of mobile stations exist, a set of respective cells formed by the base stations constituting a first location registration area group, the base stations and mobile stations communicating by packet within the cells, whereas the mobile stations transiting to a mode periodically receiving a signal transmitted from the base stations if no packet is transmitted and received for a predetermined period even in a communication state; wherein the base stations form second to n-th location registration area groups (where n is a natural number of 2 or greater), each having a range smaller than that of the first location registration area such that the area size decreases as n is greater, to be included in the first location registration area group used when the mobile stations are in idle state; and wherein the mobile station having transited to the periodically receiving mode and periodically receiving a signal moves after registering a location information in one of the first to n-th location registration area groups and, if a paging identifier is changed as a result of moving, the mobile station changes a paging interval of the signal according to the period in which no packet is transmitted and received.

For achieving the above-mentioned object, the present invention provides a communication control method in a mobile station for constituting a mobile communication system together with a plurality of base stations, a network connected to the base stations, and a location information management server, connected to the network, for managing location information of each mobile station and state information thereof; wherein, in thus configured mobile communication system, a plurality of mobile stations exist, a set of respective cells formed by the base stations constituting a first location registration area group, the base stations and mobile stations communicating by packet within the cells, whereas the mobile stations transiting to a mode periodically receiving a signal transmitted from the base stations if no packet is transmitted and received for a predetermined period even in a communication state; and wherein the base stations form second to n-th location registration area groups (where n is a natural number of 2 or greater), each having a range smaller than that of the first location registration area such that the area size decreases as n is greater, to be included in the first location registration area group used when the mobile stations are in idle state; the mobile station selecting the location registration area group to register the mobile station according to a period in which no packet is transmitted and received in the periodically receiving mode, and transmitting information of thus selected location registration area group to the location information management server for a location registration or paging of the base stations.

The present invention provides a communication control method in a mobile station for constituting a mobile communication system together with a plurality of base stations, a network connected to the base stations, and a location information management server, connected to the network, for managing location information of each mobile station and state information thereof; wherein, in thus configured mobile communication system, a plurality of mobile stations exist, a set of respective cells formed by the base stations constituting a first location registration area group, the base stations and mobile stations communicating by packet within the cells, whereas the mobile stations transiting to a mode periodically receiving a signal transmitted from the base stations if no packet is transmitted and received for a predetermined period even in a communication state; wherein the base stations form second to n-th location registration area groups (where n is a natural number of 2 or greater), each having a range smaller than that of the first location registration area such that the area size decreases as n is greater, to be included in the first location registration area group used when the mobile stations are in idle state; and wherein the mobile station having transited to the periodically receiving mode and periodically receiving a signal moves after registering a location information in one of the first to n-th location registration area groups, determines whether or not a paging identifier is changed as a result of moving, and if the detail of the paging identifier is changed, changes a paging interval of the signal according to the period in which no packet is transmitted and received.

For achieving the above-mentioned object, the present invention provides a communication control program executed by a computer provided with a mobile station constituting a mobile communication system together with a plurality of base stations, a network connected to the base stations, and a location information management server, connected to the network, for managing location information of each mobile station and state information thereof; wherein, in thus configured mobile communication system, a plurality of mobile stations exist, a set of respective cells formed by the base stations constituting a first location registration area group, the base stations and mobile stations communicating by packet within the cells, whereas the mobile stations transiting to a mode periodically receiving a signal transmitted from the base stations if no packet is transmitted and received for a predetermined period even in a communication state; and wherein the base stations form second to n-th location registration area groups (where n is a natural number of 2 or greater), each having a range smaller than that of the first location registration area such that the area size decreases as n is greater, to be included in the first location registration area group used when the mobile stations are in idle state; the communication control program comprising, as processing steps as shown in FIG. 17, a selecting step S11 of selecting the location registration area group to register own station according to a period in which no packet is transmitted and received in the periodically receiving mode, and a transmitting step S12 of transmitting information of thus selected location registration area group to the location information management server for a location registration or paging of the base stations.

The present invention provides a communication control program executed by a computer provided with a mobile station constituting a mobile communication system together with a plurality of base stations, a network connected to the base stations, and a location information management server, connected to the network, for managing location information of each mobile station and state information thereof; wherein, in thus configured mobile communication system, a plurality of mobile stations exist, a set of respective cells formed by the base stations constituting a first location registration area group, the base stations and mobile stations communicating by packet within the cells, whereas the mobile stations transiting to a mode periodically receiving a signal transmitted from the base stations if no packet is transmitted and received for a predetermined period even in a communication state; and wherein the base stations form second to n-th location registration area groups (where n is a natural number of 2 or greater), each having a range smaller than that of the first location registration area such that the area size decreases as n is greater, to be included in the first location registration area group used when the mobile stations are in idle state; the communication control program comprising, as processing steps as shown in FIG. 18, a determining step S21 of moving after registering a location information in one of the first to n-th location registration area groups while periodically receiving a signal after having transited to the periodically receiving mode, and determining whether or not a paging area identifier is changed, and a period switching step S22 of changing a paging interval of the signal according to a period in which no packet is transmitted and received if the detail of the paging area identifier is changed.

The foregoing configurations form the first to n-th location registration area groups with their sizes becoming smaller as n is greater, so that each mobile station can dynamically select them according to traffic patterns of packets, whereby the balance between paging traffic and location registration traffic can be controlled better than with the conventional techniques, and the mobile stations can perform more efficient battery conservation. If the paging interval at the time when the mobile stations shift to the above-mentioned mode is made variable in response to the location registration area selection, control can be carried out while keeping a balance between the battery conservation and the delay upon receiving incoming packets. Also, since the base stations form a location registration area group, respective location registration areas of layers overlap, whereby location registrations can be kept from fluttering near boundaries.

BRIEF DESCRIPTION OF THE DRAWINGS

FIG. 8 is a chart showing an example of relationships between base stations and paging area identifiers;

FIG. 15 is a chart showing an example of relationships between mobile stations and location registration areas;

DESCRIPTION OF THE PREFERRED EMBODIMENTS

In the following, embodiments of the location registration method and paging method in a mobile communication system, the mobile communication system, the base station, the communication control method, the mobile station, and the communication control program in accordance with the present invention will be explained with reference to the drawings.

Figure 1:
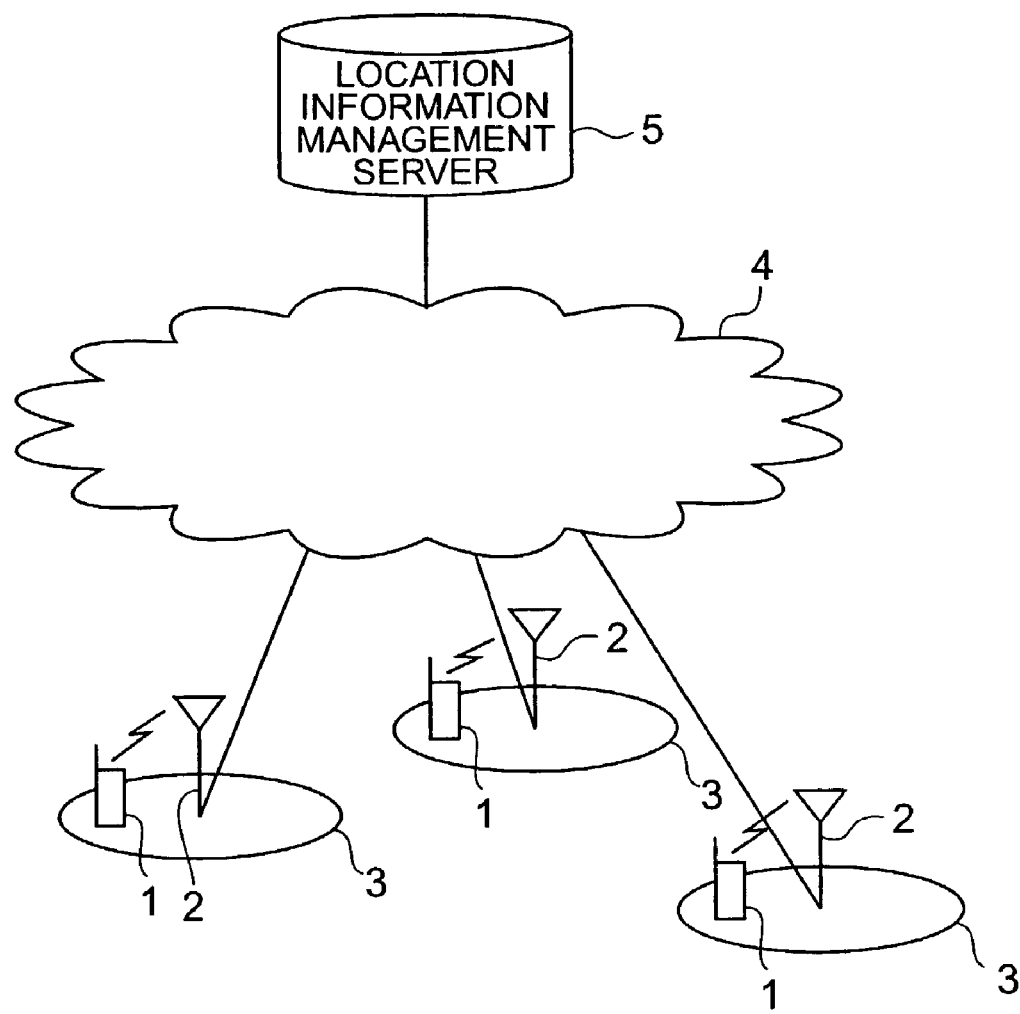
FIG. 1 is a view showing a schematic configuration of a mobile communication system in accordance with an embodiment of the present invention.

FIG. 1 shows a schematic configuration of a mobile communication system in accordance with an embodiment. Each mobile station 1 shown in FIG. 1 exists in a cell 3 formed by a base station 2, whereas location information of each mobile station 1 and state information (sleep state, OFF state, etc.) thereof are managed by a location information management server 5 connected to a network 4.

Figure 16:
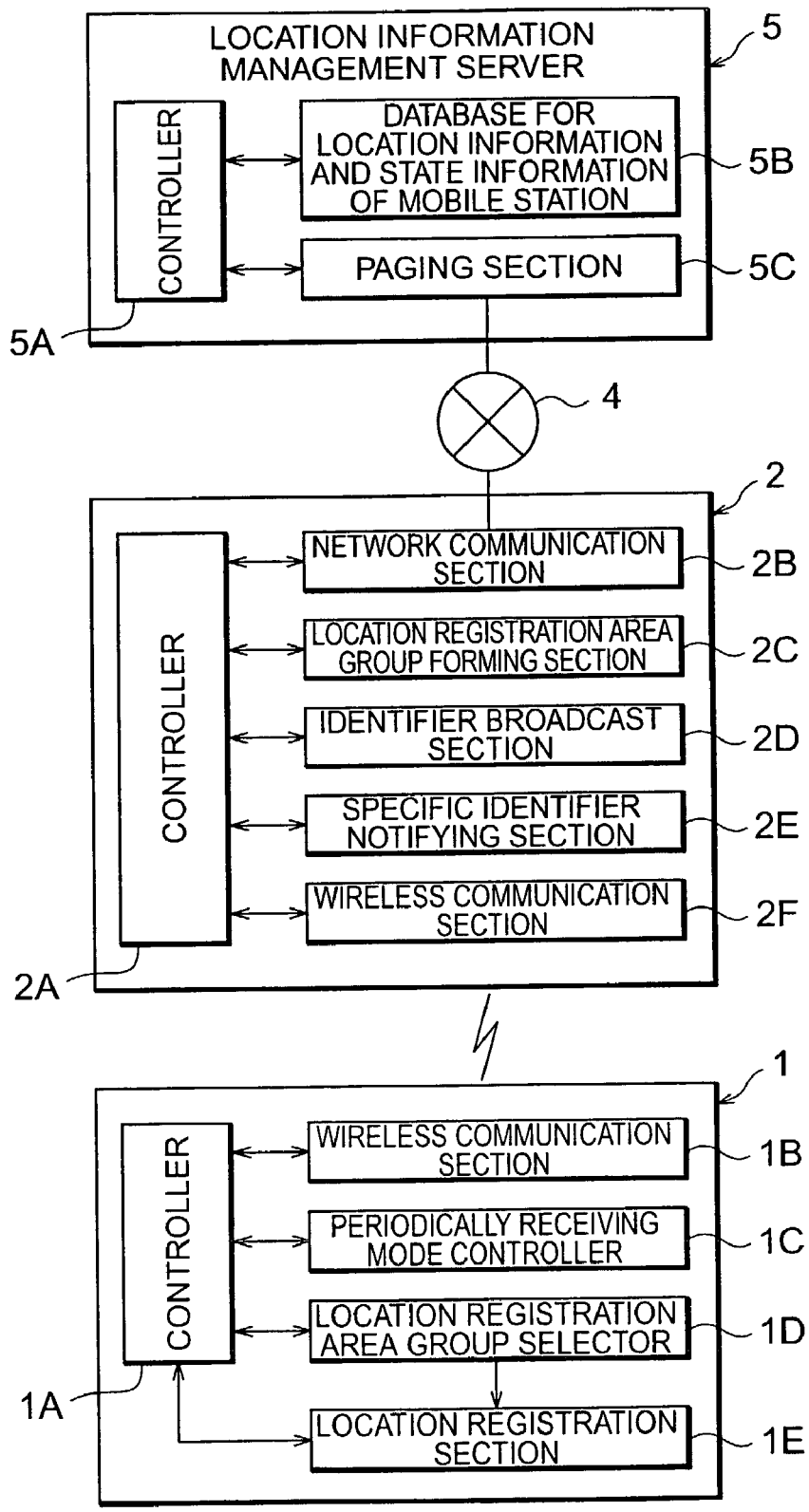
FIG. 16 is a functional block diagram showing a configuration of a mobile communication system.
Figure 17:
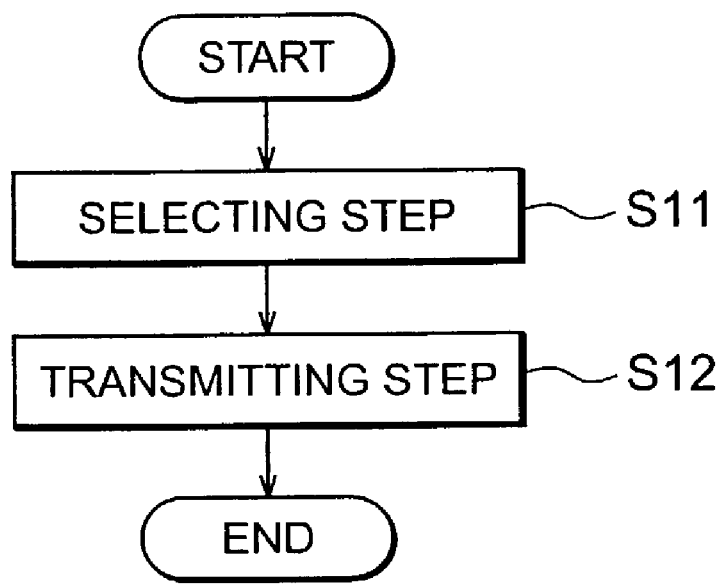
FIG. 17 is a flowchart showing a first mode of the communication control program in accordance with the present invention.
Figure 18:
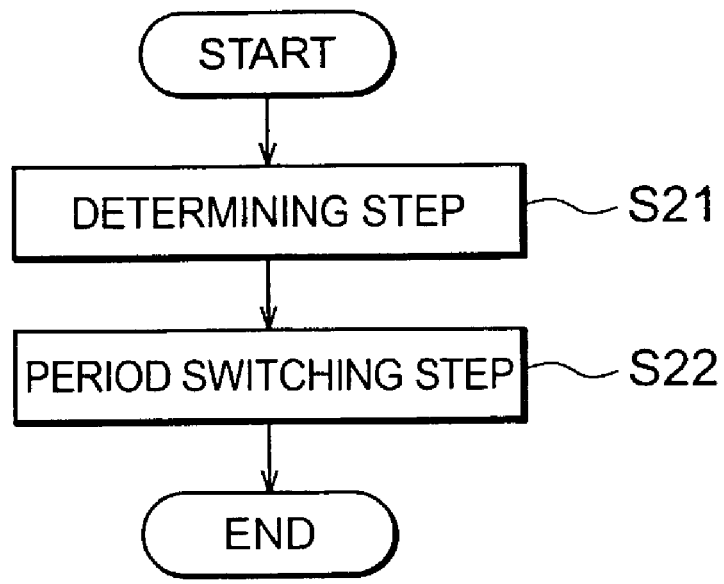
FIG. 18 is a flowchart showing a second mode of the communication control program in accordance with the present invention.

FIG. 16 shows a functional block diagram concerning the configuration of mobile communication system in accordance with this embodiment. Though FIG. 16 shows only one each of the mobile station 1 and base station 2 for simplification, a plurality of mobile stations 1 and base stations 2 in similar configurations exist in practice.

As shown in FIG. 16, the mobile station 1 includes a wireless communication section 1B for communicating by packet between mobile station and base station; a periodically receiving mode controller 1C for transiting to a mode receiving signals periodically transmitted from the base station 2 if no packet is transmitted and received for a predetermined period even in a communication state, changing this paging interval; a location registration area group selector 1D for selecting a location registration area group to register own station according to a period in which no packet is transmitted and received in the above-mentioned mode; a location registration section 1E being registered a location information to the location information management server 5 within a location registration area group; and a controller 1A for monitoring/controlling the operations of the foregoing sections.

The base station 2 includes a network communication section 2B for communicating with the location information management server 5 via the network 4; a location registration area group forming section 2C for forming a cell and cooperating with a plurality of its neighboring base stations 2 to form a plurality of levels of location registration area groups from the cell; an identifier broadcast section 2D for periodically broadcasting, in synchronization with the paging interval of each mobile station 1, respective paging identifiers corresponding to the plurality of location registration area groups formed; a specific identifier notifying section 2E for notifying, when a signal requesting a location registration from the mobile station 1, this mobile station 1 of respective specific identifiers of the base stations 2 constituting the plurality of levels according to location registration area groups; a wireless communication section 2F for communicating by packet between mobile station and base station; and a controller 2A, incorporating a timer therein, for monitoring/controlling the operations of the foregoing sections.

The location information management server 5 includes a database 5B storing location information of each mobile station and state information thereof; a paging section 5C for paging all the base stations 2 within the respective location registration areas constituting the location registration area group broadcasted by one mobile station 1 when a packet addressed to this mobile station 1 is transferred; and a controller 5A for managing the location information of each mobile station and information concerning the state thereof by using the database 5B and monitoring/controlling the operations of the foregoing sections.

The respective operations of thus configured mobile station 1, base station 2, and location information management server 5 and their cooperation will be explained later.

Methods of constructing a plurality of location registration area groups A, B, C, . . . (satisfying to the relationship of A>B>C> . . . ) existing in this embodiment will now be explained with reference to FIGS. 2, 3, and 4.

Figure 2:
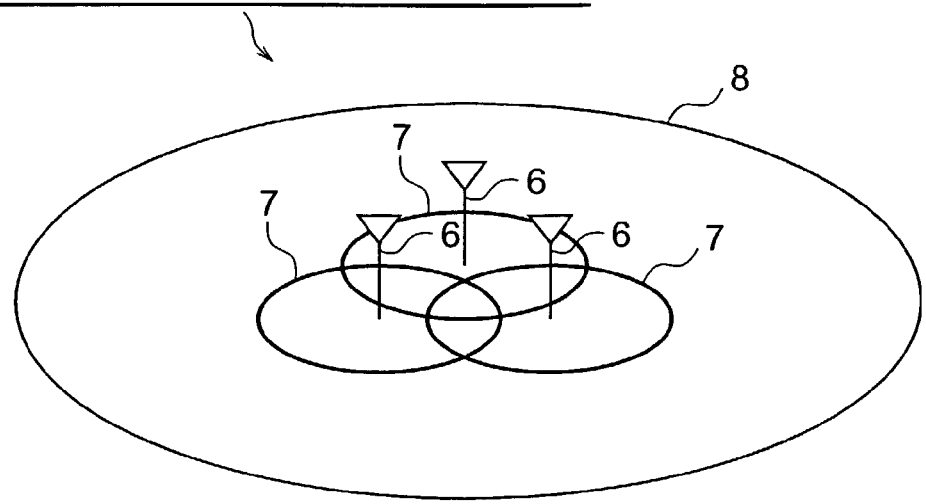
FIG. 2 is a view showing a configurational example of location registration area group A.

FIG. 2 shows the configuration of a location registration area group having the largest size, which corresponds to location registration area A. As shown in FIG. 2, a paging area 8 made by a set of cells 7, 7 formed by base stations 6, 6 is included in the location registration area group A. Since the traffic of packet communications is not frequent in mobile stations which are in idle state, using a wide location registration area such as the paging area 8 is effective in terms of network load and battery conservation.

Figure 3:
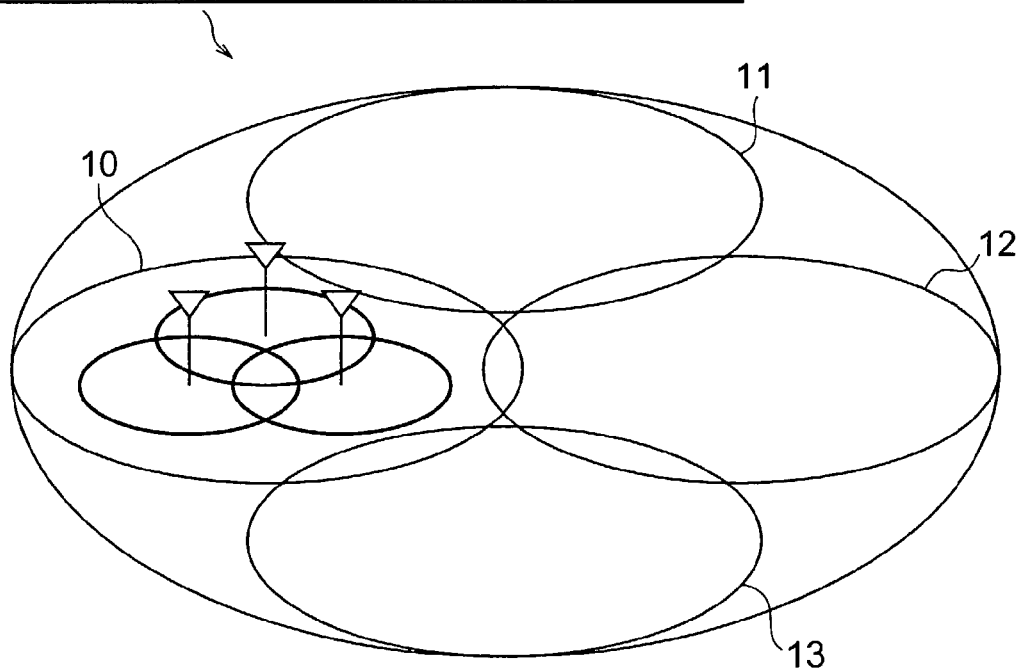
FIG. 3 is a view showing a configurational example of location registration area group B.

FIG. 3 shows location registration areas 10, 11, 12, 13, selected when a mobile station is in a sleep state for a relatively long period, constituting location registration area group B.

Figure 4:
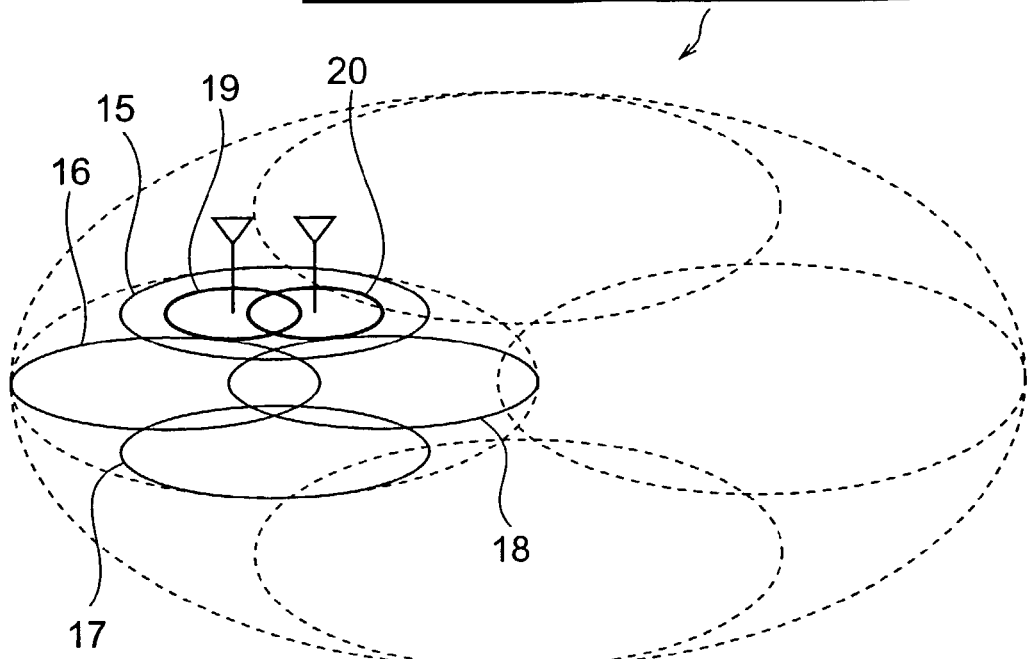
FIG. 4 is a view showing a configurational example of location registration area group C.

FIG. 4 shows location registration areas 15, 16, 17, 18 which are selected when packets are transmitted and received frequently though in a sleep state while frequent incoming traffic occurs. These location registration areas 15 to 18 constitute location registration area group C. FIG. 4 also shows location registration areas 19, 20 which are selected when packets are transmitted and received more frequently, thus yielding higher traffic, thereby generating more frequent incoming traffic. These location registration areas 19, 20 constitute location registration area group D.

In this embodiment, the mobile stations are caused to select location registration area groups taking account of the balance between the traffic of location registration and the paging traffic upon incoming calls according to the amount of traffic upon transmitting and receiving packets. Namely, when the traffic upon transmitting and receiving packets is lower, the location registration area is made greater to reduce the number of location registrations, which is effective in network load reduction and battery conservation. When the traffic is higher, by contrast, the location registration area is made smaller, which is effective in reducing the paging traffic upon incoming calls per base station.

Figure 5:
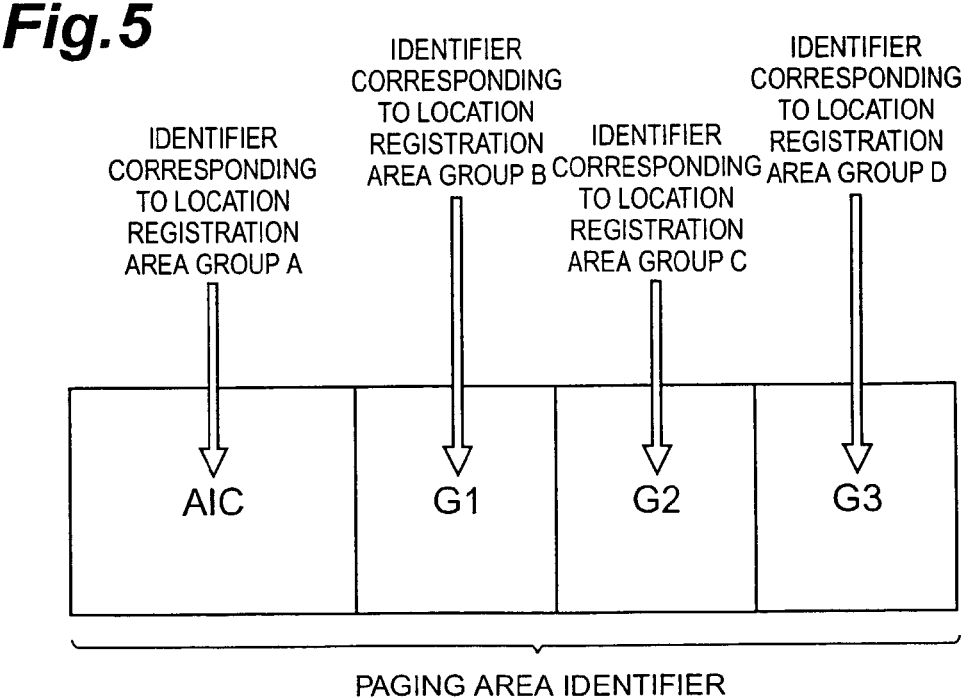
FIG. 5 is a view showing an example of paging area identifier.

FIG. 5 is a view showing an example of configuration of paging area identifier. As shown in FIG. 5, a paging area identifier is constituted by respective location registration area group identifiers (AIC, G1, G2, G3 in the order of correspondence) corresponding to the location registration area groups A, B, C, D. By using the identifier broadcast section 2D (FIG. 16), each base station broadcasts the location registration area group identifier to the mobile station periodically receiving signals.

Figures 6, 7:
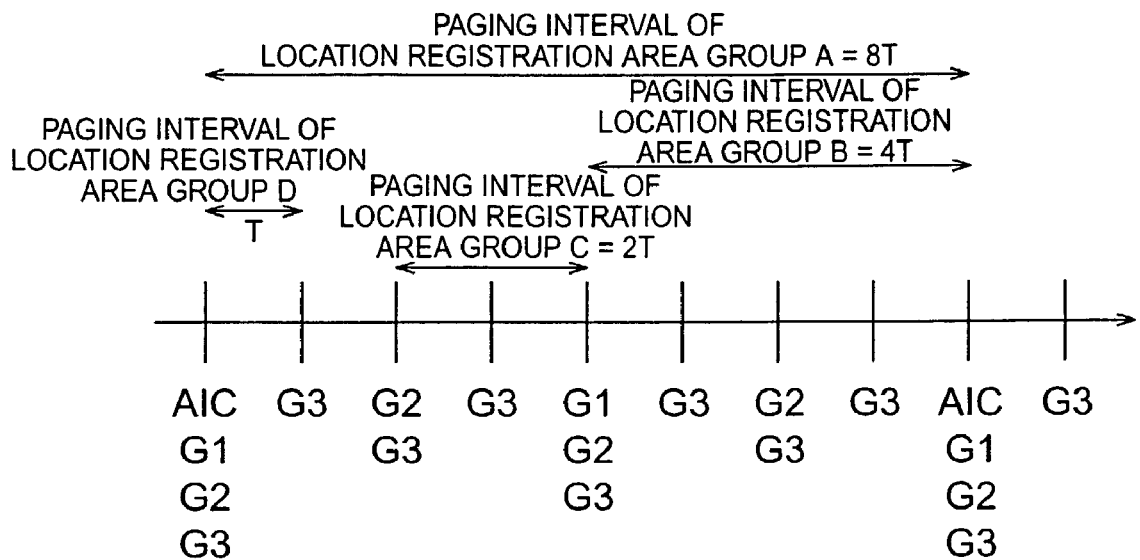
FIG. 6 is a view showing an example of periodical transmission of a base station.
FIG. 7 is a chart showing an example of relationships between mobile stations and location registration areas.

FIG. 6 is a view showing an example of periodical transmission of a base station. In FIG. 6, the paging interval of the paging area group identifier AIC corresponding to the location registration area group A is T×8, the paging interval of the paging area group identifier G1 corresponding to the location registration area group B is T×4, the paging interval of the paging area group identifier G2 corresponding to the location registration area group C is T×2, and the paging interval of the paging area group identifier G3 corresponding to the location registration area group D is T. According to these paging interval, the base station broadcasts the paging area group identifiers to a mobile station, whereas the mobile station periodically receives paging signals by the broadcasting period of the location registration area group in which a registration is made.

FIG. 7 shows a management table indicating relationships between mobile station numbers and location registration areas managed by a location information management server, whereas FIG. 8 shows a management table indicating relationships between base station numbers and location registration area groups (represented by location registration area group identifiers in FIG. 8) managed by the location information management server. Now, using FIGS. 7 and 8, a procedure in which an incoming packet arriving at the location information management server is transferred to a destination mobile station is explained. Here, the destination mobile station is assumed to be MT#4.

According to the information of the receiving packet included destination mobile station MT#4, the location information management server refers to the location registration area of MT#4. As a result of reference, MT#4 is found in the location registration area D3. Since the location registration area D3 is recognized as a consequence, the location registration area D3 is subsequently referred to by using FIG. 8. Then, the base stations forming the location registration area D3 are found to be BS#5 and BS#6, whereby paging packets multicasts to them. If a response from BS#5 occurs as a result of paging, then a packet is transferred to thus responded base station BS#5.

Figure 9:
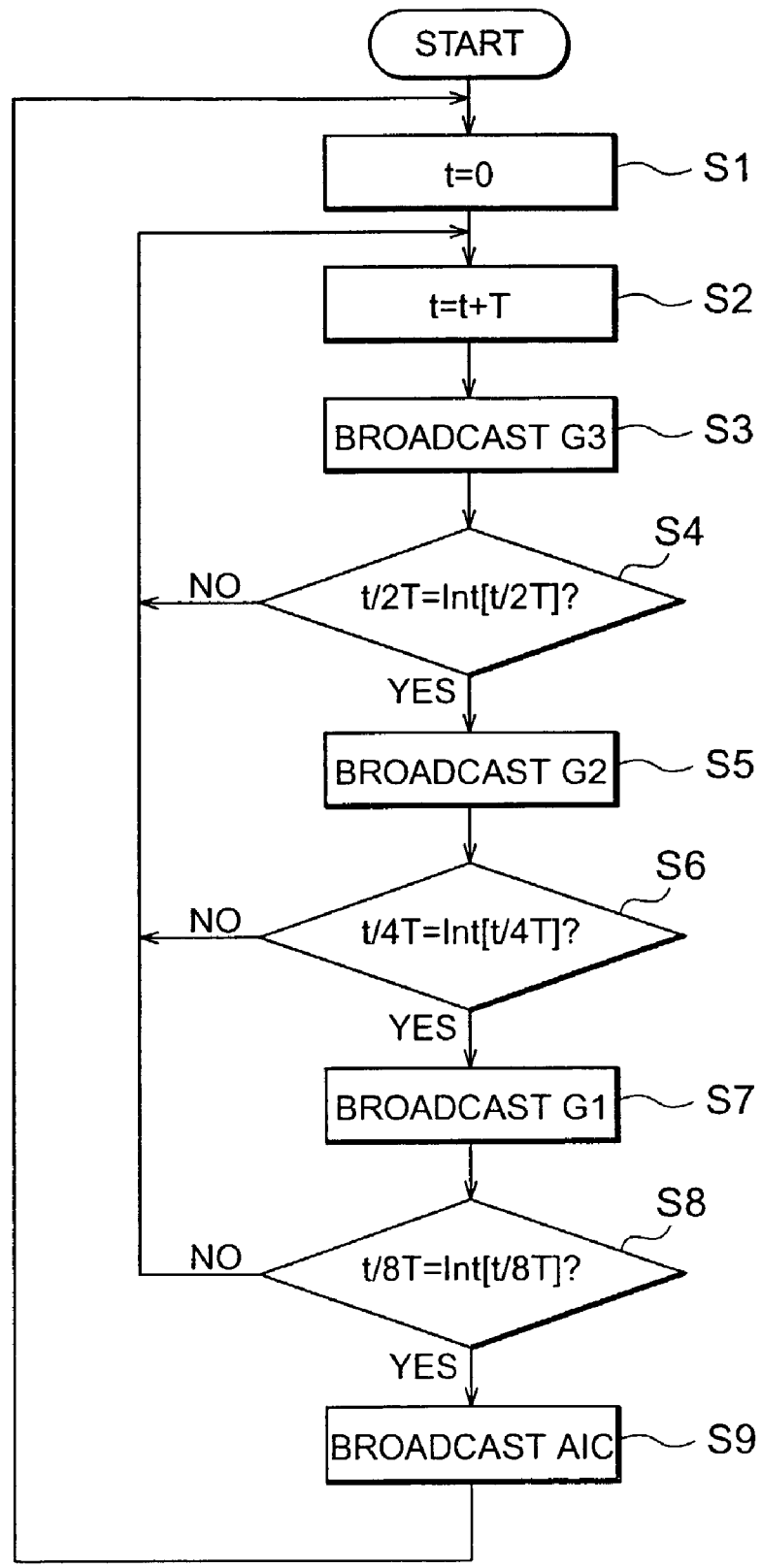
FIG. 9 is a flowchart showing operations of a base station.

Operations of a base station transmitting periodically to a mobile station will now be explained with reference to the flowchart shown in FIG. 9. First, a timer t for setting the timing for transmitting periodically is set to 0 (step S1). Subsequently, after a wait of the period T of paging interval (step S2), the identifier G3 corresponding to the location registration area group D is transmitted at intervals of period T (step S3). It is determined whether the value obtained when t is divided by 2T is an integer or not (step S4). If not, the flow proceeds to step S2, whereby a wait of the paging interval T is effected. If the value obtained when t is divided by 2T is determined to be an integer at step S4, by contrast, then the identifier G2 corresponding to the location registration area group C is transmitted (step S5). Similarly, it is determined whether the value obtained when t is divided by 4T is an integer or not (step S6), and the identifier G1 corresponding to the location registration area group B is transmitted if thus obtained value is an integer (step S7). Also, it is determined whether the value obtained when t is divided by 8T is an integer or not (step S8). If thus obtained value is an integer, then the identifier AIC corresponding to the location registration area group A is transmitted (step S9). These operations are repeated, to broadcast the paging area identifier corresponding to the individual location registration area group.

Consequently, as shown in FIG. 6, the identifier G3 corresponding to the location registration area group D is transmitted at intervals of the period T, the identifier G2 corresponding to the location registration area group C is transmitted at intervals of the period 2T , the identifier 3G1 corresponding to the location registration area group B is transmitted at intervals of the period 4T , and the identifier AIC corresponding to the location registration area group A is transmitted at intervals of the period 8T.

The identifiers G1, G2, G3, AIC are transmitted to the mobile station together with control signals. Namely, the control signals are periodically broadcasted not at a fixed timing but in synchronization with the paging interval of each mobile station as with the identifiers.

Figure 10:
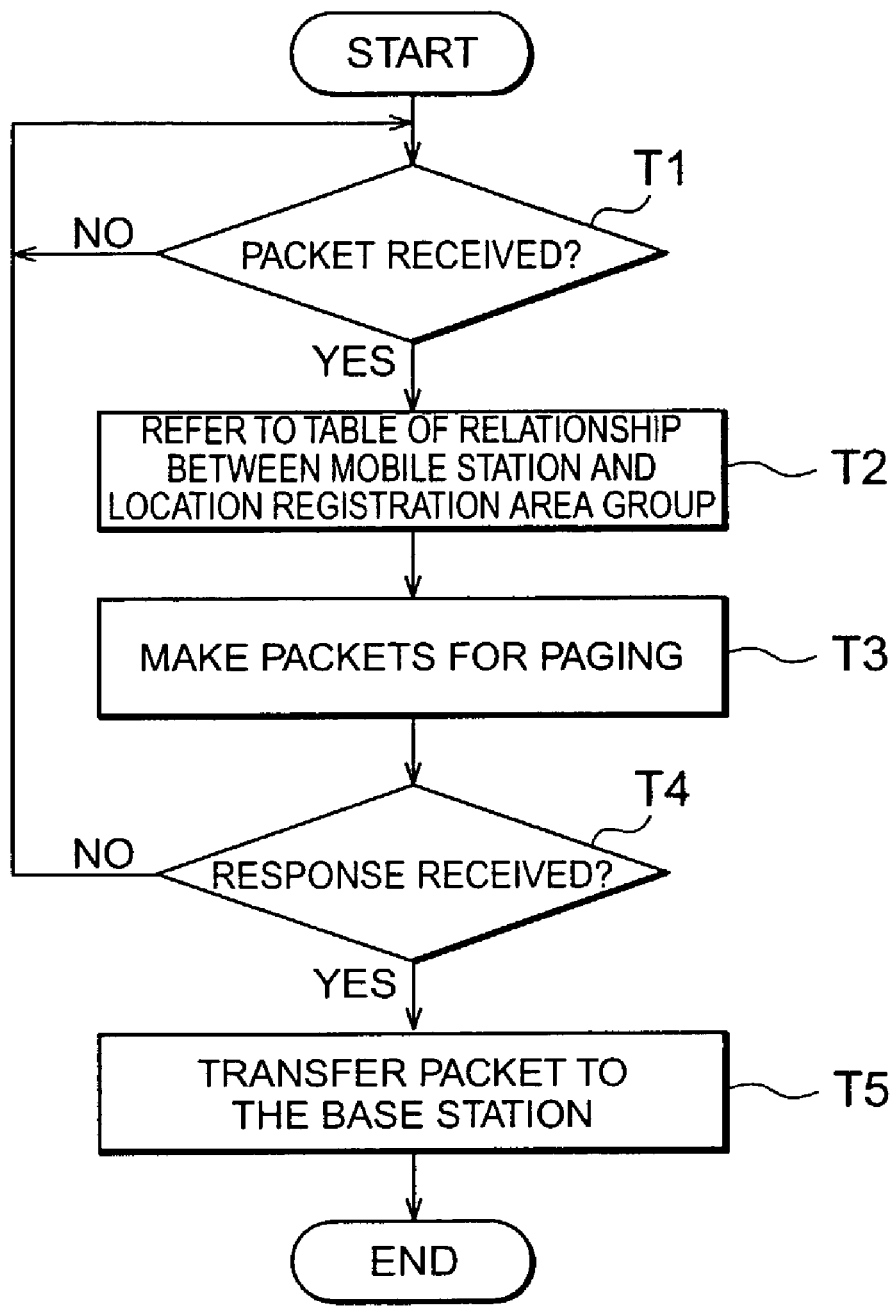
FIG. 10 is a flowchart showing operations of a location information management server.

FIG. 10 is a flowchart showing operations of a location information management server. If there is an incoming packet (step T1), then the location information management server refers to the location registration area group in which the destination mobile station of the incoming packet has registered its location, according to the table of relationships between mobile stations and location registration area groups corresponding to the respective paging intervals of the mobile stations (step T2). Based on the reference information, the packet for paging is made with respect to a plurality of base stations within the location registration areas in this location registration area group (step T3). To the base station responded by the mobile station (step S4) as a result of paging, the incoming packet is transferred (step T5).

Figure 11:
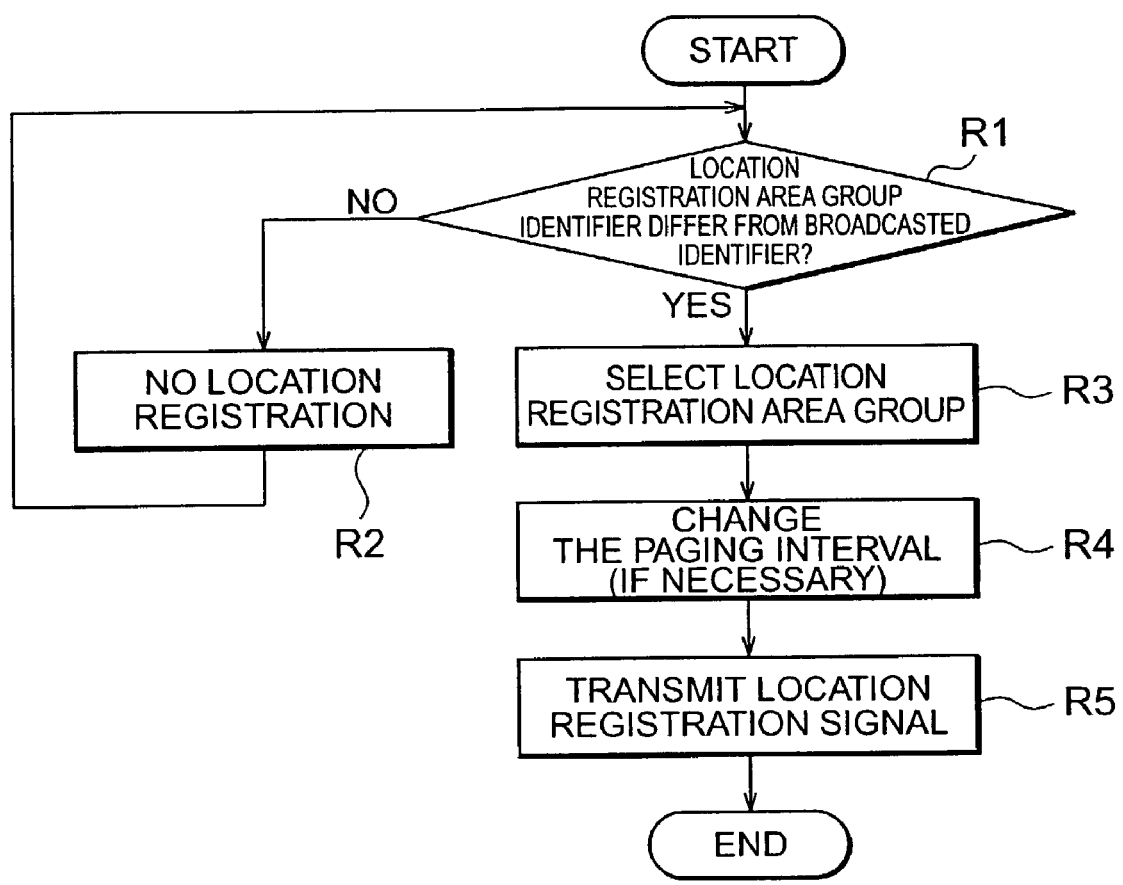
FIG. 11 is a flowchart showing operations of a mobile station.

FIG. 11 is a flowchart showing operations of a mobile station. When the mobile station periodically receiving signals receives a paging area identifier broadcasted from abase station, the processing of FIG. 11 is started. First, it is determined whether the location registration area in which the mobile station has registered its location differs from the broadcasted identifier or not (step R1). If the information of the identifier stored in the mobile station is found to be the same as that of the broadcasted identifier as a result of the determination, then the location registration is not updated (step R2). If they differ from each other, then the location registration area group corresponding to the paging interval of the mobile station is reselected (step R3). If necessary in this case, the mobile station changes the paging interval (e.g., defines a sleep mode in an idle state in which no packet is transmitted and received for a predetermined period of time and changes the paging interval at the time of sleep mode) (step R4) The information of thus updated location registration area group is transmitted as location registration information to the location information management server (step R5).

At step R3 in FIG. 11, the mobile station itself autonomously reselects the location registration area group corresponding to the paging interval and transmits the information of thus updated location registration area group as location registration information to the location information management server, which makes it possible to control in conformity to the traffic characteristic of each mobile station specific to packet communications, whereby the location registration area can be kept at a more appropriate size, and battery can be conserved. Also, when the paging interval of sleep mode is made variable at step R4, battery can be conserved.

Thus, the operations of steps R3, R4 are also effective when performed separately. When processing as in FIG. 11, a location registration area having a size corresponding to the traffic pattern can be selected, and the paging interval at the time of sleep mode can be altered in conformity to this selection, whereby the location registration traffic and the paging traffic for packets can be controlled in balance.

Also employable is an embodiment in which, for a mobile station in a periodically receiving mode, the location registration area group to register the mobile station is selected according to the period in which no packets are transmitted and received in the mobile station, and thus selected location registration area group is broadcasted to the mobile station.

Figure 19:
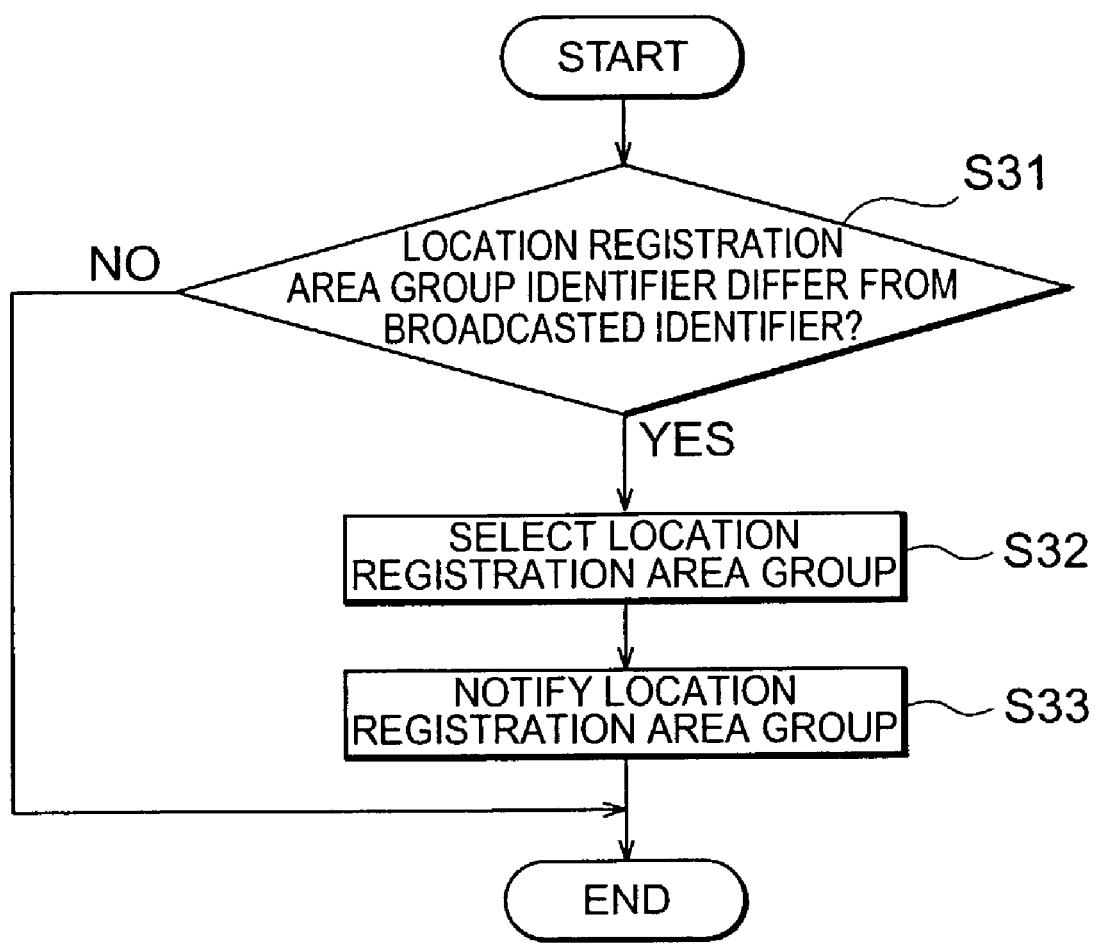
FIG. 19 is a flowchart showing an embodiment in which a base station selects a location registration area group of a mobile station.

For example, a base station may process the following processing shown in FIG. 19. Namely, with respect to a mobile station in a periodically receiving mode, the base station determines whether the location registration area group identifier of the mobile station and the identifier broadcasted to the mobile station differ from each other or not (step S31), selects the location registration area group corresponding to the paging interval of the mobile station if these identifiers differ from each other (step S32), and notifies the mobile station of thus selected location registration area group (step S33).

Figure 12:
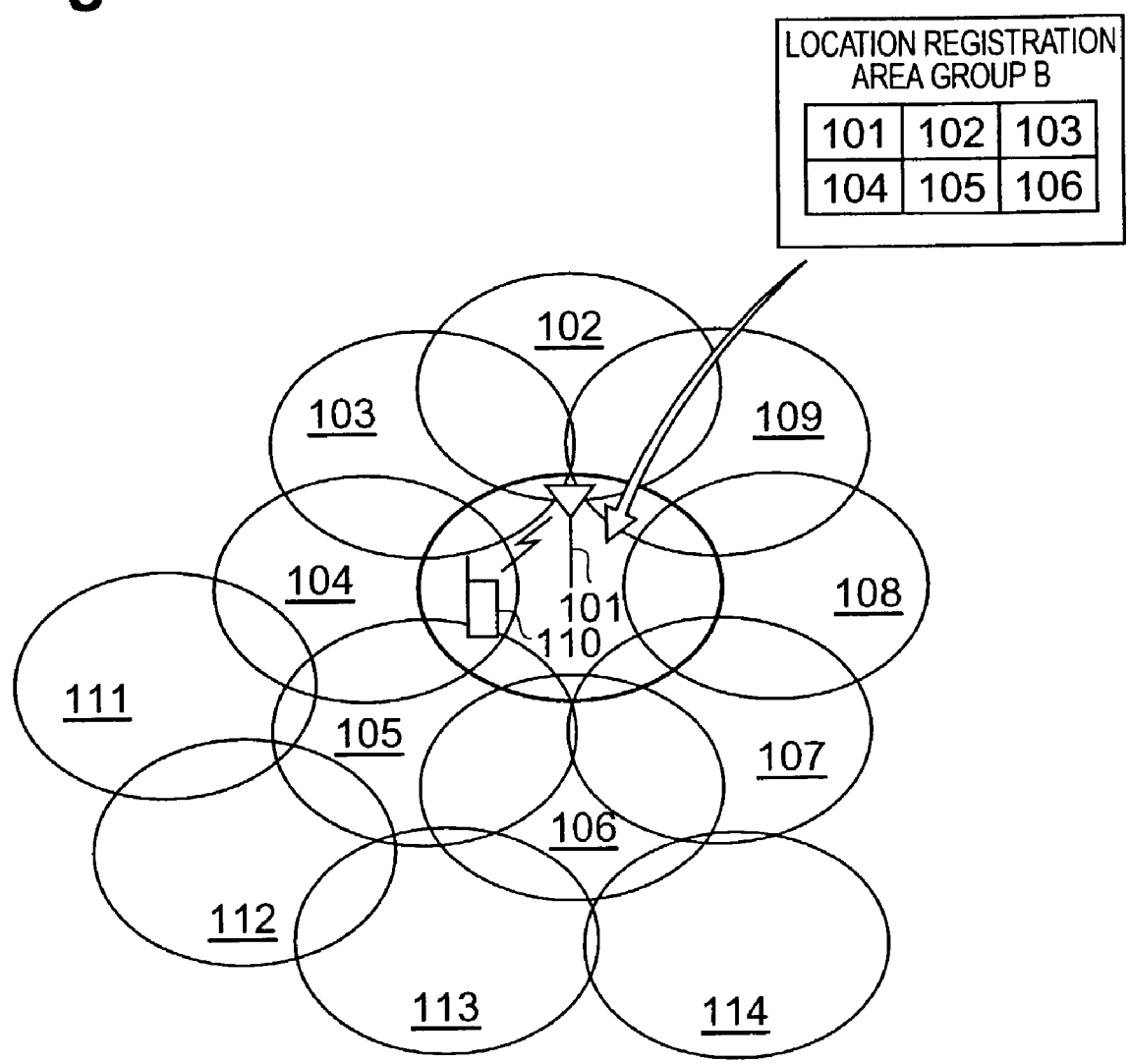
FIG. 12 is a view showing how signals are transmitted and received between base stations and a mobile station in a mobile communication system.

FIG. 12 is a view showing how signals are transmitted and received between base stations and a mobile station in a mobile communication system in this embodiment. It is assumed that base stations 101 to 109 are connected to each other via radio or network, to be able to transmit and receive signals therebetween, whereas the location information of the mobile station is managed by a location information management server. The mobile station 110 exists in the cell formed by the base station 101, and is about to register its location in the base station 101 forming this cell. Here, the mobile station 110 is assumed to register its location in the location registration area corresponding to the location registration area group B. It is assumed that the location registration areas corresponding to the location registration area group B are constituted by the cells formed by the base stations 101 to 106. The mobile station 110 having registered its location in the base station 101 is notified of the base station groups constituting the location registration area group B by the base station 101 as shown in FIG. 12. Such information may be broadcasted to each mobile station by periodical transmission as well.

Figure 13:
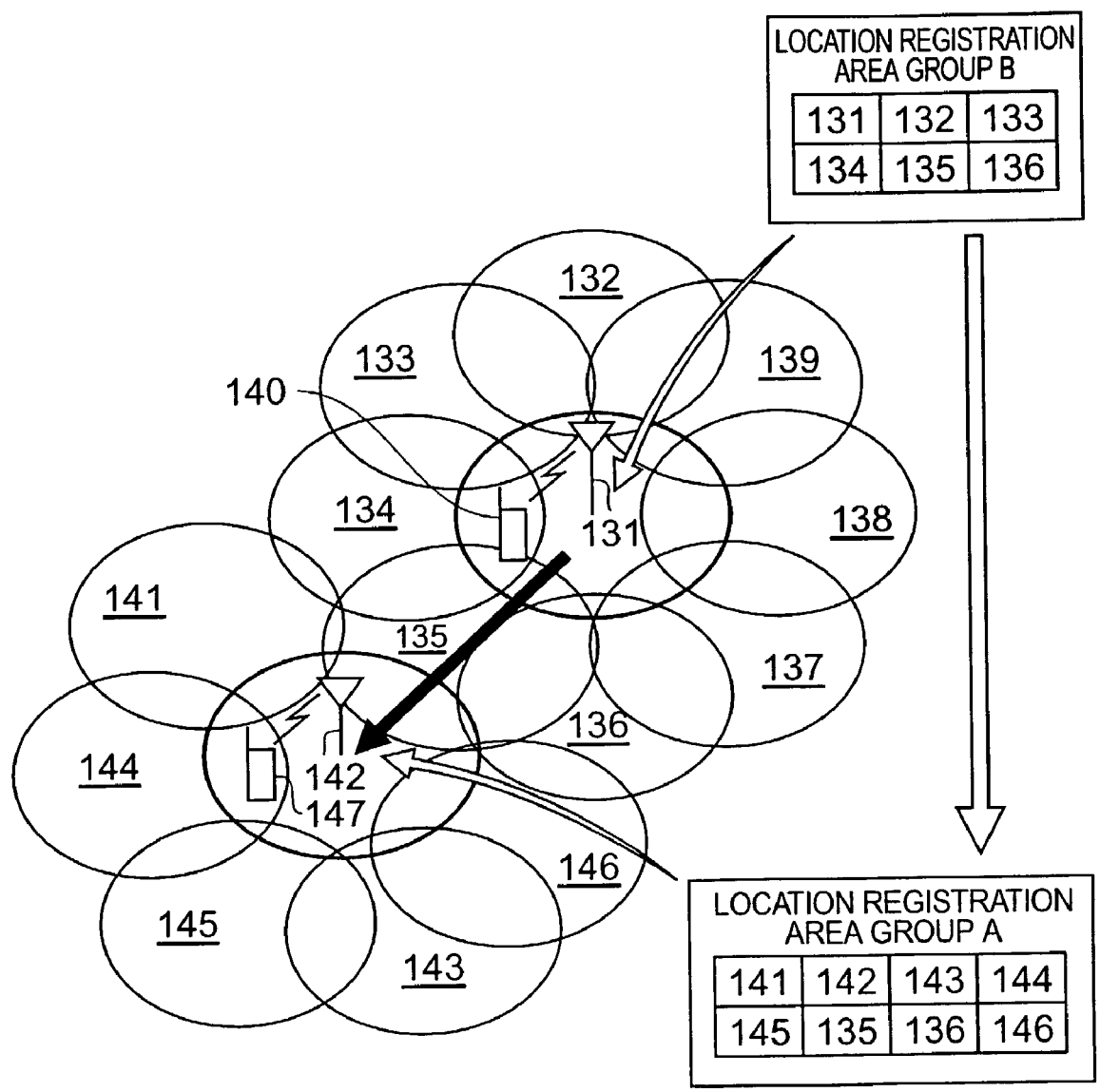
FIG. 13 is a view showing how signals are transmitted and received between base stations and a mobile station in a mobile communication system when the mobile station moves.

FIG. 13 shows a case where a mobile station 140 moves to a cell 142 which is not included in the location registration area group B of the cell formed by the base station 131 (referred to as cell 131, as in the following) in which the mobile station 140 has registered its location in the mobile communication system in FIG. 12. The location registration area group B is constituted by cells 131 to 136.

Now, the mobile station 140 is assumed to move to the cell 142 not included in the location registration areas corresponding to the location registration area group B. The mobile station 147 after the movement registers its location since the cell 142 is not included in the cells stored in the mobile station 147. In this case, the mobile station 147 changes the location registration area group from B to A, and broadcasts it to the base station 142, whereby the base station 142 notifies the mobile station 147 of the information of the location registration area group A constituted by cells 135, 136, 141, 142, 143, 144, 145, and 146 as updated information. The location registration area specific to a base station is formed as follows: The base station communicates with neighboring base stations via radio or network each time a base station is newly built in the vicinity thereof or at predetermined intervals, to exchange information about longitudes and latitudes. This makes it possible to recognize a nearby base station located at a location close to the former base station. According to this information, the location registration area centered at the latter base station is reconstructed.

Figure 14:
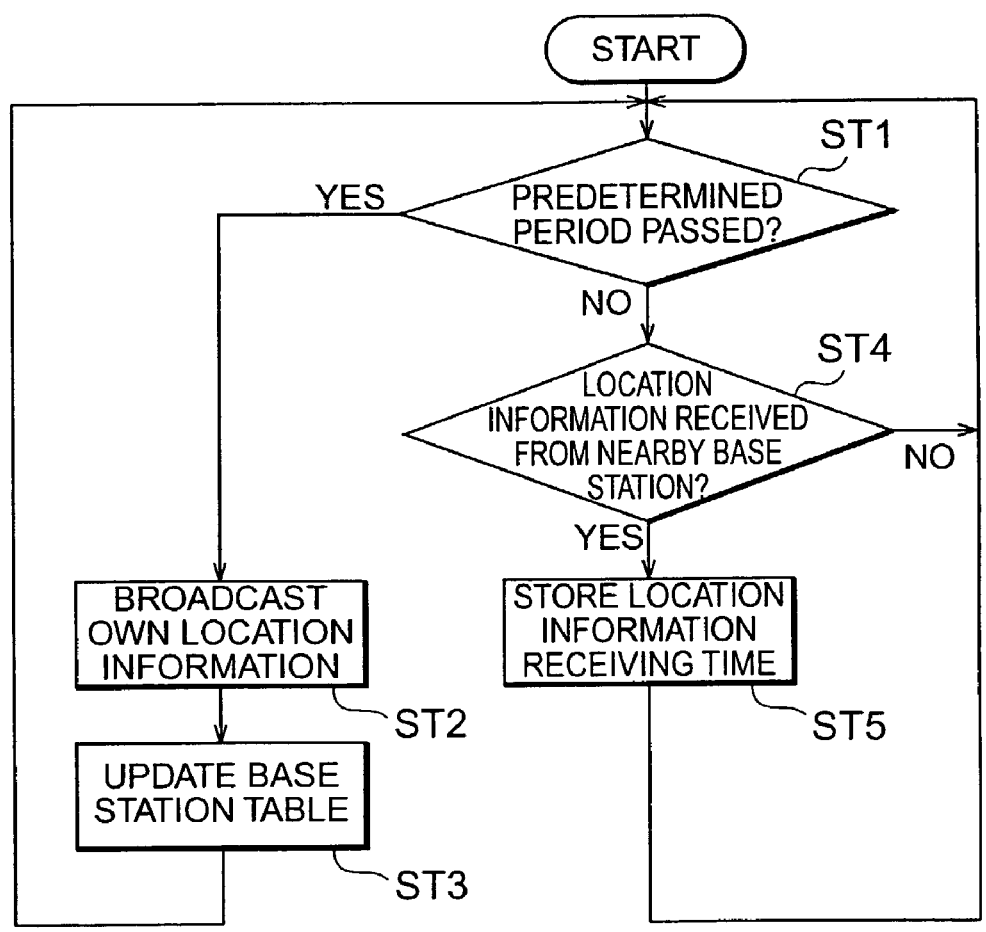
FIG. 14 is a flowchart showing operations of a base station.

FIG. 14 is a flowchart showing operations of a base station. The base station communicates with neighboring base stations via radio or via network at predetermined intervals, to exchange location registration information, thereby preparing a location information management table for base stations neighboring the base station. First, at predetermined intervals, e.g., once a day in the night when traffic is lower, the base station determines whether it is a location information exchange period or not (step ST1). If it is the location information exchange period, then the base station broadcasts location information (longitude, latitude, etc.) to the neighboring base stations via radio or via network (step ST2). As a result of broadcasting, the base station exchanges location information with the neighboring base stations, grasps the positions of surrounding base stations, and updates the location information management table for the surrounding base stations (step ST3). If the location information similarly broadcast from a base station near the base station (step ST4) is received, then the base station stores the receiving time of the location information which is broadcasted from the nearby base station (step ST5). If no update from a nearby base station is effected for a predetermined period, then the nearby base station is assumed to be removed, whereby the base station updates its own location information management table.

FIG. 15 shows a database indicating relationships between mobile stations and location registration areas in this embodiment. Base stations having already transmitted to those location information with their surrounding base stations and exchanged location information form respective location registration area groups for the base stations, and broadcast this information to mobile stations when the latter register their positions or as notification information of a notification n channel. Thus notified mobile station recognizes the base station to register its own location. When registrating a location information, the mobile station notifies the location information management server of the base station in which the mobile station should register its own location. According to thus notified information, the location information management server stores the information of the location registration area for each mobile station and constructs the database of FIG. 15.

Since a location registration area group is defined for each base station as such, location registration areas of the individual layers can be set in an overlapping fashion, which is effective in restraining the location registration from fluttering near boundaries, while the location registration areas, which have conventionally been constructed manually, are automatically carried out by use of base-to-base communications, whereby the cost can be cut down.

In accordance with the present invention, as explained in the foregoing, a mobile station carrying out packet communications defines a sleep mode while in an idle state in which no communications are performed for a predetermined period of time, changes the paging interval at the time of sleep mode, and selects a location registration area having a size corresponding to the traffic pattern, whereby the location registration traffic and the paging traffic for packets upon incoming calls can be controlled in balance.

While a scheme for hand-over for each cell has increased the location registration traffic at the time of hand-over accompanying the cell transiting, thus being problematic in terms of the channel efficiency decrease, battery consumption, and fluttering of location registration near cell boundaries, the present invention can keep the number of location registrations lower, to realize effective battery conservation, thus can make less the size of individual terminals, and can lengthen talk time and standby time. At the same time, the number of operations of transmitting and receiving signals can be decreased, whereby the channel efficiency can be increased.

Though a scheme using known paging areas has been problematic in that the paging traffic upon incoming calls increases to constrain the PCH channel capacity, the present invention can suppress the paging capacity to the minimum, thus being effective in increasing the channel efficiency.

Also, since the paging interval at the time of sleep mode is made variable according to the selection of location registration area group, the battery conservation and the delay at the time of receiving incoming packets can be controlled in balance.

Further, the respective location registration areas of the individual layers can be set in an overlapping fashion to define a location registration area group for each base station, thus being effective in restraining the location registration from fluttering near boundaries, and the location registration area configuration, which has conventionally been effected manually, is automatically carried out by the base station communicating with neighboring base stations, whereby the cost can be cut down.

What is claimed is:

1. A mobile communication system constituted by a plurality of base stations, a plurality of mobile stations, a network connected to base stations, and a location information management server, connected to said network, for managing location information of each mobile station and state information thereof; a set of respective cells formed by base stations constituting a first location registration area group, base stations and mobile stations communicating by packet within said cells, whereas said mobile stations transiting to a mode periodically receiving a signal transmitted from base stations if no packet is transmitted and received for a predetermined period even in a communication state;

wherein said base stations form second to n-th location registration area groups (where n is a natural number of 2 or greater), each having a range smaller than that of first location registration area such that the area size decreases as n is greater, to be included in first location registration area group used when mobile stations are not in said communication state; and wherein mobile stations select location registration area groups to register mobile stations according to a period in which no packet is transmitted and received in periodically receiving mode, and register a location information to the server while specifying a location registration area within said location registration area group with respect to said location information management server.

2. A mobile communication system according to claim 1, wherein said base station has a plurality of paging area identifiers respectively corresponding to first to n-th location registration area groups, and periodically broadcasts said paging area identifiers in synchronization with a paging interval of each mobile station.

3. A mobile communication system according to claim 1, wherein mobile station having transited to said mode and periodically receiving a signal moves after registering a location information in one of first to n-th location registration area groups and, if a paging identifier is changed as a result of moving, said mobile station registers a location information after reselecting one of said location registration area groups according to the period in which no packet is transmitted and received and changes the paging interval.

4. A mobile communication system according to claim 1, wherein said base stations exchange location information with a plurality of base stations adjacent thereto via radio or via network, and individually form first to n-th location registration area groups according to thus exchanged location information of adjacent base stations.

5. A mobile communication system according to claim 4, wherein said base stations are discriminated from each other according to respective specific identifiers assigned thereto and, upon receiving a signal requesting a location registration from said mobile station, notify said mobile station of respective specific identifiers of said base stations constituting first to n-th location registration area groups.

6. A mobile communication system according to claim 3, wherein mobile station receives said specific identifier broadcasted from said base station in periodically receiving mode, and registers a location information if thus received specific identifier is not included in said specific identifiers of said base stations constituting said location registration area groups when said mobile station registered a location information.

7. A mobile communication system constituted by a plurality of base stations, a plurality of mobile stations, a network connected to said base stations, and a location information management server, connected to said network, for managing location information of each mobile station and state information thereof; a set of respective cells formed by said base stations constituting a first location registration area group, said base stations and mobile stations communicating by packet within said cells, whereas said mobile stations transiting to a mode periodically receiving a signal transmitted from said base stations if no packet is transmitted and received for a predetermined period even in a communication state;
  wherein said base stations form second to n-th location registration area groups (where n is a natural number of 2 or greater), each having a range smaller than that of first location registration area such that the area size decreases as n is greater, to be included in first location registration area group used when said mobile stations are not in said communication state;
  wherein a packet transmitted to said mobile station is transferred to said location information management server and then, according to information in said location information management server, to said base station forming a cell in which said destination mobile station exists;
  wherein mobile station notifies said location information management server of a shift to said mode or a cancellation of said communication state when transiting to said mode or canceling said communication state and specifies said location registration area group; and
  wherein said location information management server carries out paging with respect to said base stations within said location registration areas constituting said location registration area notified by said mobile station when said packet transmitted to said mobile station is transferred.

8. A mobile communication system according to claim 7, wherein said base station has a plurality of paging area identifiers respectively corresponding to first to n-th location registration area groups, and periodically broadcasts said paging area identifiers in synchronization with a paging interval of each mobile station.

9. A mobile communication system according to claim 8, wherein mobile station having transited to said mode and periodically receiving a signal moves after registering a location information in one of first to n-th location registration area groups and,
  if said paging identifier is changed as a result of moving, said mobile station registers a location information after reselecting one of said location registration area groups according to the period in which no packet is transmitted and received and changes the paging interval.

10. A mobile communication system according to claim 7, wherein base stations exchange location information with a plurality of base stations adjacent thereto via radio or via network, and individually form first to n-th location registration area groups according to thus exchanged location information of adjacent base stations.

11. A base station, connected to a network, for constituting a mobile communication system together with a plurality of mobile stations, said network, and a location information management server, connected to said network, for managing location information of each mobile station and state information thereof;
  wherein, in mobile communication system, a plurality of base stations exist, a set of respective cells formed by said base stations constituting a first location registration area group, said base stations and mobile stations communicating by packet within said cells, whereas said mobile stations transiting to a mode periodically receiving a signal transmitted from said base stations if no packet is transmitted and received for a predetermined period even in a communication state; and
  wherein said base stations form second to n-th location registration area groups (where n is a natural number of 2 or greater), each having a range smaller than that of first location registration area such that the area size decreases as n is greater, to be included in first location registration area group used when said mobile stations are not in said communication state;
  base station having a plurality of paging area identifiers respectively corresponding to first to n-th location registration area groups, base station periodically broadcasting said paging area identifiers and a control signal in synchronization with a paging interval of each mobile station.

12. A base station, connected to a network, for constituting a mobile communication system together with a plurality of mobile stations, said network, and a location information management server, connected to said network, for managing location information of each mobile station and state information thereof;
  wherein, in mobile communication system, a plurality of base stations exist, a set of respective cells formed by base stations constituting a first location registration area group, said base stations and mobile stations communicating by packet within said cells, whereas said mobile stations transiting to a mode periodically receiving a signal transmitted from said base stations if no packet is transmitted and received for a predetermined period even in a communication state; and
  wherein said base stations form second to n-th location registration area groups (where n is a natural number of 2 or greater), each having a range smaller than that of first location registration area such that the area size decreases as n is greater, to be included in first location registration area group used when said mobile stations are not in said communication state;
  said base station exchanging location information with a plurality of base stations adjacent thereto via radio or via network and individually forming first to n-th location registration area groups according to thus exchanged location information of adjacent base stations.

13. A base station according to claim 12, wherein said base station is discriminated from another base station by a specific identifier assigned thereto; and wherein, upon receiving a signal requesting a location registration from said mobile station, said base station notifies said mobile station of respective specific identifiers of said base stations constituting first to n-th location registration area groups.

14. A base station, connected to a network, for constituting a mobile communication system together with a plurality of mobile stations, said network, and a location information management server, connected to said network, for managing location information of each mobile station and state information thereof;

wherein, in mobile communication system, a plurality of base stations exist, a set of respective cells formed by said base stations constituting a first location registration area group, said base stations and mobile stations communicating by packet within said cells, whereas said mobile stations transiting to a mode periodically receiving a signal transmitted from said base stations if no packet is transmitted and received for a predetermined period even in a communication state; and wherein said base stations form second to n-th location registration area groups (where n is a natural number of 2 or greater), each having a range smaller than that of first location registration area such that the area size decreases as n is greater, to be included in first location registration area group used when said mobile stations are not in said communication state;

said base station selecting said location registration area group to register a mobile station in said periodically receiving mode according to a period in which no packet is transmitted and received in mobile station, and notifying said mobile station of information of said selected location registration area group.

15. A communication control method in a base station, connected to a network, for constituting a mobile communication system together with a plurality of mobile stations, said network, and a location information management server, connected to said network, for managing location information of each mobile station and state information thereof;

wherein, in mobile communication system, a plurality of base stations exist, a set of respective cells formed by said base stations constituting a first location registration area group, said base stations and mobile stations communicating by packet within said cells, whereas said mobile stations transiting to a mode periodically receiving a signal transmitted from said base stations if no packet is transmitted and received for a predetermined period even in a communication state; and wherein said base stations form second to n-th location registration area groups (where n is a natural number of 2 or greater), each having a range smaller than that of first location registration area such that the area size decreases as n is greater, to be included in first location registration area group used when said mobile stations are not in said communication state;

said base station having a plurality of paging area identifiers respectively corresponding to first to n-th location registration area groups, said base station periodically broadcasting said paging area identifiers and a control signal in synchronization with a paging interval of each mobile station.

16. A communication control method in a base station, connected to a network, for constituting a mobile communication system together with a plurality of mobile stations, said network, and a location information management server, connected to said network, for managing location information of each mobile station and state information thereof;

wherein, in mobile communication system, a plurality of base stations exist, a set of respective cells formed by said base stations constituting a first location registration area group, said base stations and mobile stations communicating by packet within said cells, whereas said mobile stations transiting to a mode periodically receiving a signal transmitted from said base stations if no packet is transmitted and received for a predetermined period even in a communication state; and wherein said base stations form second to n-th location registration area groups (where n is a natural number of 2 or greater), each having a range smaller than that of first location registration area such that the area size decreases as n is greater, to be included in first location registration area group used when said mobile stations are not in said communication state;

said base station exchanging location information with a plurality of base stations adjacent thereto via radio or via network and individually forming first to n-th location registration area groups according to thus exchanged location information of adjacent base stations.

17. A communication control method according to claim 15, wherein said base station is discriminated from another base station by a specific identifier assigned thereto; and wherein, upon receiving a signal requesting a location registration from said mobile station, said base station notifies said mobile station of respective specific identifiers of said base stations constituting first to n-th location registration area groups.

18. A communication control method in a base station, connected to a network, for constituting a mobile communication system together with a plurality of mobile stations, said network, and a location information management server, connected to said network, for managing location information of each mobile station and state information thereof;

wherein, in mobile communication system, a plurality of base stations exist, a set of respective cells formed by said base stations constituting a first location registration area group, said base stations and mobile stations communicating by packet within said cells, whereas said mobile stations transiting to a mode periodically receiving a signal transmitted from said base stations if no packet is transmitted and received for a predetermined period even in a communication state; and wherein said base stations form second to n-th location registration area groups (where n is a natural number of 2 or greater), each having a range smaller than that of first location registration area such that the area size decreases as n is greater, to be included in first location registration area group used when said mobile stations are not in said communication state;

said base station selecting said location registration area group to register a mobile station in said periodically receiving mode according to a period in which no packet is transmitted and received in mobile station and notifying said mobile station of information of said selected location registration area group.

19. A mobile station for constituting a mobile communication system together with a plurality of base stations, a network connected to said base stations, and a location information management server, connected to said network, for managing location information of each mobile station and state information thereof;

wherein, in mobile communication system, a plurality of mobile stations exist, a set of respective cells formed by said base stations constituting a first location registration area group, said base stations and mobile stations communicating by packet within said cells, whereas said mobile stations transiting to a mode periodically receiving a signal transmitted from said base stations if no packet is transmitted and received for a predetermined period even in a communication state; and wherein said base stations form second to n-th location registration area groups (where n is a natural number of 2 or greater), each having a range smaller than that of first location registration area such that the area size decreases as n is greater, to be included in first location registration area group used when said mobile stations are not in said communication state;

said mobile station selecting said location registration area group to register said mobile station according to a period in which no packet is transmitted and received in said periodically receiving mode, and transmitting information of said selected location registration area group to said location information management server for a location registration or paging of said base stations.

20. A mobile station for constituting a mobile communication system together with a plurality of base stations, a network connected to said base stations, and a location information management server, connected to said network, for managing location information of each mobile station and state information thereof;

wherein, in mobile communication system, a plurality of mobile stations exist, a set of respective cells formed by said base stations constituting a first location registration area group, said base stations and mobile stations communicating by packet within said cells, whereas said mobile stations transiting to a mode periodically receiving a signal transmitted from said base stations if no packet is transmitted and received for a predetermined period even in a communication state; wherein said base stations form second to n-th location registration area groups (where n is a natural number of 2 or greater), each having a range smaller than that of first location registration area such that the area size decreases as n is greater, to be included in first location registration area group used when said mobile stations are not in said communication state; and wherein mobile station having transited to said periodically receiving mode and periodically receiving a signal moves after registering a location information in one of first to n-th location registration area groups and, if a paging identifier is changed as a result of moving, said mobile station changes a paging interval of said signal according to the period in which no packet is transmitted and received.

21. A communication control method in a mobile station for constituting a mobile communication system together with a plurality of base stations, a network connected to said base stations, and a location information management server, connected to said network, for managing location information of each mobile station and state information thereof;

wherein, in mobile communication system, a plurality of mobile stations exist, a set of respective cells formed by said base stations constituting a first location registration area group, said base stations and mobile stations communicating by packet within said cells, whereas said mobile stations transiting to a mode periodically receiving a signal transmitted from said base stations if no packet is transmitted and received for a predetermined period even in a communication state; and wherein said base stations form second to n-th location registration area groups (where n is a natural number of 2 or greater), each having a range smaller than that of first location registration area such that the area size decreases as n is greater, to be included in first location registration area group used when said mobile stations are not in said communication state;

said mobile station selecting said location registration area group to register said mobile station according to a period in which no packet is transmitted and received in said periodically receiving mode, and transmitting information of said selected location registration area group to said location information management server for a location registration or paging of said base stations.

22. A communication control method in a mobile station for constituting a mobile communication system together with a plurality of base stations, a network connected to said base stations, and a location information management server, connected to said network, for managing location information of each mobile station and state information thereof;

wherein, in mobile communication system, a plurality of mobile stations exist, a set of respective cells formed by said base stations constituting a first location registration area group, said base stations and mobile stations communicating by packet within said cells, whereas said mobile stations transiting to a mode periodically receiving a signal transmitted from said base stations if no packet is transmitted and received for a predetermined period even in a communication state; wherein said base stations form second to n-th location registration area groups (where n is a natural number of 2 or greater), each having a range smaller than that of first location registration area such that the area size decreases as n is greater, to be included in first location registration area group used when said mobile stations are not in said communication state; and wherein mobile station having transited to said periodically receiving mode and periodically receiving a signal moves after registering a location information in one of first to n-th location registration area groups, and determines whether or not a paging identifier is changed as a result of moving, and if the detail of said paging identifier is changed, said mobile station changes a paging interval of said signal according to the period in which no packet is transmitted and received.

23. A communication control program executed by a computer provided with a mobile station constituting a mobile communication system together with a plurality of base stations, a network connected to said base stations, and a location information management server, connected to said network, for managing location information of each mobile station and state information thereof;

wherein, in mobile communication system, a plurality of mobile stations exist, a set of respective cells formed by said base stations constituting a first location registration area group, said base stations and mobile stations communicating by packet within said cells, whereas said mobile stations transiting to a mode periodically receiving a signal transmitted from said base stations if no packet is transmitted and received for a predetermined period even in a communication state; and wherein said base stations form second to n-th location registration area groups (where n is a natural number of 2 or greater), each having a range smaller than that of first location registration area such that the area size decreases as n is greater, to be included in first location registration area group used when said mobile stations are not in said communication state;

said communication control program comprising, as processing steps, a selecting step of selecting said location registration area group to register own station according to a period in which no packet is transmitted and received in said periodically receiving mode, and a transmitting step of transmitting information of said selected location registration area group to said location information management server for a location registration or paging of said base stations.

24. A communication control program executed by a computer provided with a mobile station constituting a mobile communication system together with a plurality of base stations, a network connected to said base stations, and a location information management server, connected to said network, for managing location information of each mobile station and state information thereof;

wherein, in mobile communication system, a plurality of mobile stations exist, a set of respective cells formed by said base stations constituting a first location registration area group, said base stations and mobile stations communicating by packet within said cells, whereas said mobile stations transiting to a mode periodically receiving a signal transmitted from said base stations if no packet is transmitted and received for a predetermined period even in a communication state; and wherein said base stations form second to n-th location registration area groups (where n is a natural number of 2 or greater), each having a range smaller than that of first location registration area such that the area size decreases as n is greater, to be included in first location registration area group used when said mobile stations are not in said communication state;

said communication control program comprising, as processing steps, a determining step of moving after registering a location information in one of first to n-th location registration area groups while periodically receiving a signal after having transited to said periodically receiving mode, and determining whether or not a paging area identifier is changed, and a period switching step of changing a paging interval of said signal according to a period in which no packet is transmitted and received if the detail of said paging area identifier is changed.

* * * * *